US007383409B2

(12) United States Patent
Steely, Jr. et al.

(10) Patent No.: US 7,383,409 B2
(45) Date of Patent: *Jun. 3, 2008

(54) CACHE SYSTEMS AND METHODS FOR EMPLOYING SPECULATIVE FILLS

(75) Inventors: Simon C. Steely, Jr., Hudson, NH (US); Gregory Edward Tierney, Chelmsford, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 432 days.

This patent is subject to a terminal disclaimer.

(21) Appl. No.: 10/756,638

(22) Filed: Jan. 13, 2004

(65) Prior Publication Data

US 2005/0154834 A1 Jul. 14, 2005

(51) Int. Cl.
*G06F 9/00* (2006.01)
*G06F 9/38* (2006.01)
*G06F 13/00* (2006.01)

(52) U.S. Cl. .................. 711/169; 711/100; 711/146; 711/141; 711/118; 711/117; 712/217; 712/216; 712/1

(58) Field of Classification Search ............... None
See application file for complete search history.

(56) References Cited

U.S. PATENT DOCUMENTS

| 5,197,132 A | 3/1993 | Steely, Jr. et al. |
| 5,222,224 A | 6/1993 | Flynn et al. |
| 5,404,483 A | 4/1995 | Stamm et al. |
| 5,420,991 A * | 5/1995 | Konigsfeld et al. ......... 711/150 |
| 5,519,841 A | 5/1996 | Sager et al. |
| 5,625,829 A | 4/1997 | Gephardt et al. |
| 5,651,125 A * | 7/1997 | Witt et al. .................. 712/218 |
| 5,721,855 A * | 2/1998 | Hinton et al. .............. 712/218 |
| 5,802,577 A | 9/1998 | Bhat et al. |
| 5,829,040 A | 10/1998 | Son |
| 5,845,101 A | 12/1998 | Johnson et al. |
| 5,875,467 A | 2/1999 | Merchant |
| 5,875,472 A | 2/1999 | Bauman et al. |
| 5,958,019 A | 9/1999 | Hagersten et al. |
| 6,032,231 A | 2/2000 | Gujral |
| 6,055,605 A | 4/2000 | Sharma et al. |
| 6,081,887 A | 6/2000 | Steely, Jr. et al. |
| 6,085,263 A | 7/2000 | Sharma et al. |
| 6,108,737 A | 8/2000 | Sharma et al. |
| 6,134,646 A | 10/2000 | Feiste et al. |
| 6,151,671 A | 11/2000 | D'Sa et al. |

(Continued)

OTHER PUBLICATIONS

T.N. Vijaykumar et al., "Speculative Versioning Cache", IEEE Transactions on Parallel and Distributed Systems, vol. 12, No. 12, Dec. 2001.*

(Continued)

*Primary Examiner*—Sanjiv Shah
*Assistant Examiner*—Sam Dillon

(57) ABSTRACT

One disclosed embodiment is a multi-processor system comprising a processor having a processor pipeline that executes program instructions with data from a speculative fill that is provided in response to a source request. The multi-processor system can further comprise a non-retired store cache that retains non-retired store data based on program instructions to store data into a data cache associated with the processor. The non-retired store data can be written to the data cache if data of a speculative fill associated with the non-retired store data is determined to be coherent. Other apparatus and methodologies are disclosed.

33 Claims, 9 Drawing Sheets

U.S. PATENT DOCUMENTS

| | | | |
|---|---|---|---|
| 6,209,065 B1 | 3/2001 | Van Doren et al. | |
| 6,275,905 B1* | 8/2001 | Keller et al. | 711/141 |
| 6,286,090 B1 | 9/2001 | Steely, Jr. et al. | |
| 6,301,654 B1 | 10/2001 | Ronchetti et al. | |
| 6,317,811 B1 | 11/2001 | Deshpande et al. | |
| 6,345,342 B1 | 2/2002 | Arimilli et al. | |
| 6,349,382 B1 | 2/2002 | Feiste et al. | |
| 6,356,918 B1 | 3/2002 | Chuang et al. | |
| 6,408,363 B1 | 6/2002 | Lesartre et al. | |
| 6,412,067 B1 | 6/2002 | Ramirez et al. | |
| 6,457,101 B1 | 9/2002 | Bauman et al. | |
| 6,493,802 B1* | 12/2002 | Razdan et al. | 711/144 |
| 6,535,941 B1 | 3/2003 | Kruse | |
| 6,553,480 B1 | 4/2003 | Cheong et al. | |
| 6,574,712 B1 | 6/2003 | Kahle et al. | |
| 6,591,348 B1 | 7/2003 | Deshpande et al. | |
| 6,594,821 B1 | 7/2003 | Banning et al. | |
| 6,615,343 B1 | 9/2003 | Talcott et al. | |
| 6,633,960 B1 | 10/2003 | Kessler et al. | |
| 6,633,970 B1* | 10/2003 | Clift et al. | 712/217 |
| 6,651,143 B2 | 11/2003 | Mounes-Toussi | |
| 6,775,749 B1* | 8/2004 | Mudgett et al. | 711/146 |
| 7,234,029 B2* | 6/2007 | Khare et al. | 711/146 |
| 2001/0055277 A1 | 12/2001 | Steely, Jr. et al. | |
| 2002/0009095 A1 | 1/2002 | Van Doren et al. | |
| 2002/0099833 A1 | 7/2002 | Steely, Jr. et al. | |
| 2002/0099913 A1 | 7/2002 | Steely, Jr. | |
| 2002/0146022 A1 | 10/2002 | Van Doren et al. | |
| 2002/0194290 A1 | 12/2002 | Steely, Jr. et al. | |
| 2002/0194436 A1 | 12/2002 | McKenney | |
| 2002/0199067 A1* | 12/2002 | Patel et al. | 711/145 |
| 2003/0069902 A1 | 4/2003 | Narang et al. | |
| 2003/0145136 A1 | 7/2003 | Tierney et al. | |
| 2003/0195939 A1 | 10/2003 | Edirisooriya et al. | |

OTHER PUBLICATIONS

Jim Handy, "The Cache Memory Book", 1998, Academic Press Inc., 2nd ed., pp. 142-143.*

Intel, "An Overview of Cache", Dec. 21, 1996, http://www.intel.com/design/intarch/papers/cache6.pdf.*

M. H. Lipasti, C. B. Wilkerson, and J. P. Shen. Value locality and load value prediction. In Proceedings of the Seventh International Conference on Architectural Support for Programming Languages and Operating Systems, pp. 138-147, Oct. 1-5, 1996.*

Kozyrakis, C.E. Vector IRAM: ISA and Micro-architecture. IEEE Computer Elements Workshop, Vail, CO, Jun. 21-24, 1998.*

M. Cintra, J. F. Martnez, and J. Torrellas. Architectural support for scalable speculative parallelization in shared-memory multiprocessors. In Proceedings of the 27th Annual International Symposium on Computer Architecture, Jun. 2000.*

Rajiv Gupta. The Fuzzy Barrier: a mechanism for high speed synchronization of processors. Proceedings of the third international conference on Architectural support for programming languages and operating systems. Apr. 3-6, 1989.*

Sato, T.; Ohno, K.; Nakashima, H. A mechanism for speculative memory accesses following synchronizing operations. Parallel and Distributed Processing Symposium, 2000. IPDPS 2000. Proceedings. 14th International.*

Gharachorloo, et al., "Memory Consistency and Event Ordering in Scalable Shared-Memory Multiprocessors", Computer Systems Laboratory, Stanford University, CA 94305, pp. 1-14.

Gharachorloo, et al., "Architecture and Design of AlphaServer GS320", pp. 1-16.

* cited by examiner

CACHE SYSTEMS AND METHODS FOR EMPLOYING SPECULATIVE FILLS

CROSS REFERENCE TO RELATED APPLICATIONS

This application is related to the following commonly assigned co-pending patent applications entitled: "COHERENT SIGNAL IN A MULTI-PROCESSOR SYSTEM," application Ser. No. 10/756,636; "MULTI-PROCESSOR SYSTEMS AND METHODS FOR BACKUP FOR NON-COHERENT SPECULATIVE FILLS," application Ser. No. 10/756,637; "REGISTER FILE SYSTEMS AND METHODS FOR EMPLOYING SPECULATIVE FILLS," application Ser. No. 10/756,644; "SYSTEMS AND METHODS FOR EXECUTING ACROSS AT LEAST ONE MEMORY BARRIER EMPLOYING SPECULATIVE FILLS," application Ser. No. 10/756,639; "MULTI-PROCESSOR SYSTEM UTILIZING SPECULATIVE SOURCE REQUESTS," application Ser. No. 10/746,640; "MULTI-PROCESSOR SYSTEM RECEIVING INPUT FROM A PRE-FETCH BUFFER," application Ser. No. 10/756,535; "SOURCE REQUEST ARBITRATION," application Ser. No. 10/755,919; "SYSTEMS AND METHODS FOR EMPLOYING SPECULATIVE FILLS," application Ser. No. 10/755,938; "CONSISTENCY EVALUATION OF PROGRAM EXECUTION ACROSS AT LEAST ONE MEMORY BARRIER," application Ser. No. 10/756,534, all of which are filed contemporaneously herewith and are incorporated herein by reference.

BACKGROUND

Multiprocessor systems employ two or more computer processors that can communicate with each other, such as over a bus or a general interconnect network. In such systems, each processor may have its own memory cache (or cache store) that is separate from the main system memory that the individual processors can access. Cache memory connected to each processor of the computer system can often enable faster access to data than if accessed from the main system memory. Caches are useful because they tend to reduce latency associated with accessing data on cache hits, and they work to reduce the number of requests to system memory. In particular, a write-back cache enables a processor to write changes to data in the cache without simultaneously updating the contents of memory. Modified data can be written back to memory at a later time.

Coherency protocols have been developed to ensure that whenever a processor reads or writes to a memory location it receives the correct or true data. Additionally, coherency protocols help ensure that the system state remains deterministic by providing rules to enable only one processor to modify any part of the data at any one time. If proper coherency protocols are not implemented, however, inconsistent copies of data can be generated.

Modern microprocessors employ instruction pipelines in order to increase program execution speeds. A superscalar processor is a processor that issues multiple independent instructions into multiple pipelines or execution units allowing multiple instructions to execute in parallel. A pre-fetch engine includes an instruction fetch unit that fetches program instructions which are translated into micro-operands by a decoder and assigned a sequence number by an allocation unit. The instructions are streamed into multiple execution units that execute in parallel. Once executed, the instructions can be retired.

Microprocessors employ either an in-order pipeline which retires instructions in strict program order, or an out-of order pipeline which executes instructions out-of-order to increase program execution speed, but requires the re-ordering of results prior to retiring instructions. In a multi-processor system that employs a cache coherency protocol, either pipeline type will stall during an issuing of a source request as a result of a cache miss. The trend is for the ratio of the memory latency to the processor cycle time to grow in future microprocessor applications. This trend results in cache misses serviced by the system to become an increased portion of the execution time of an application.

SUMMARY

One embodiment of the present invention relates to a multi-processor system. The multi-processor system may comprise a processor having a processor pipeline that executes program instructions with data from a speculative fill that is provided in response to a source request. A multi-processor system can further comprise a non-retired store cache that retains non-retired store data based on program instructions to store data into a data cache associated with the processor. The non-retired store data can be written to the data cache if data of a speculative fill associated with the non-retired store data is determined to be coherent.

Another embodiment of the present invention may comprise a processor in a multi-processor system. The processor may include a processor pipeline that executes program instructions with a speculative data fill that is received in response to a source request. The processor may further include a cache backup system operative to set a data cache associated with the processor to a cache state corresponding to a previous processor pipeline execution state in the event that the speculative fill is determined to be non-coherent.

Yet another embodiment of the invention may comprise a multi-processor system that employs a cache coherency protocol. The system may comprise means for executing program instructions associated with a source processor employing speculative data fills received in response to a source requests, means for storing executed store entries associated with program store instruction executed by the means for executing, means for retiring the executed store entries by writing the executed store entries into a data cache if a speculative data fill associated with the executed store entry is determined to be coherent, and means for setting the data cache to a backup point if a speculative fill is determined to be non-coherent.

Still another embodiment of the invention may comprise a method of executing program instructions employing a speculative fill in a multi-processor system. The method may include executing program instructions with data from a speculative fill that is provided in response to a source request and storing executed store entries in a log, such that each of the executed store entries include a store address and store data associated with a respective executed store instruction. The method may further include writing store data associated with a respective executed store entry from the log to an associated store address in a data cache, if data from the speculative fill associated with an executed store entry has been determined to be coherent.

DETAILED DESCRIPTION

This disclosure relates generally to systems and methods for processor speculation and backup in a multi-processor system. A source processor employs a speculative data fill in response to source request. A source request is a request for data associated with a cache line from the multi-processor system. The source request will be generated in response to a processor load or store instruction that experiences a cache miss, such that the requested memory block or data fill associated with a cache line does not reside in the processor's local cache. A data fill refers to a copy of a memory block associated with a given cache line. The source processor can employ one or more speculative fills or copies of the requested data to continue program instruction execution, until a coherent fill is returned from the multi-processor system. Once the coherent fill is returned, the source processor can continue execution if the speculative fill is the same as the coherent fill or backup and re-execute program instructions if the speculative fill is different from the coherent fill.

The systems and methods employ a cache system that can set to a cache state associated with a processor backup state in the event that a speculative fill is determined to be non-coherent. In one embodiment, the cache system includes a non-retired store cache that retains non-retired store data based on program instructions to store data into a data cache associated with a processor. The non-retired store data is written into the data cache if data of a speculative fill associated with the non-retired store data is determined to be coherent. If data of a speculative fill associated with the non-retired store data is determined to be non-coherent, the non-retired store data is flushed from the non-retired store cache and not written to the data cache. Therefore, only coherent data will be written to the data cache.

The cache system can include a log that includes executed store entries for each store to the non-retired store cache, where each executed store entry includes a cache line address and a store value associated with a given store to the non-retired store cache. The executed store entries can be removed from the log and written to the data cache (e.g., retired) if data of a speculative fill associated with the non-retired store data is determined to be coherent and prior memory references have been resolved.

Figure 1:
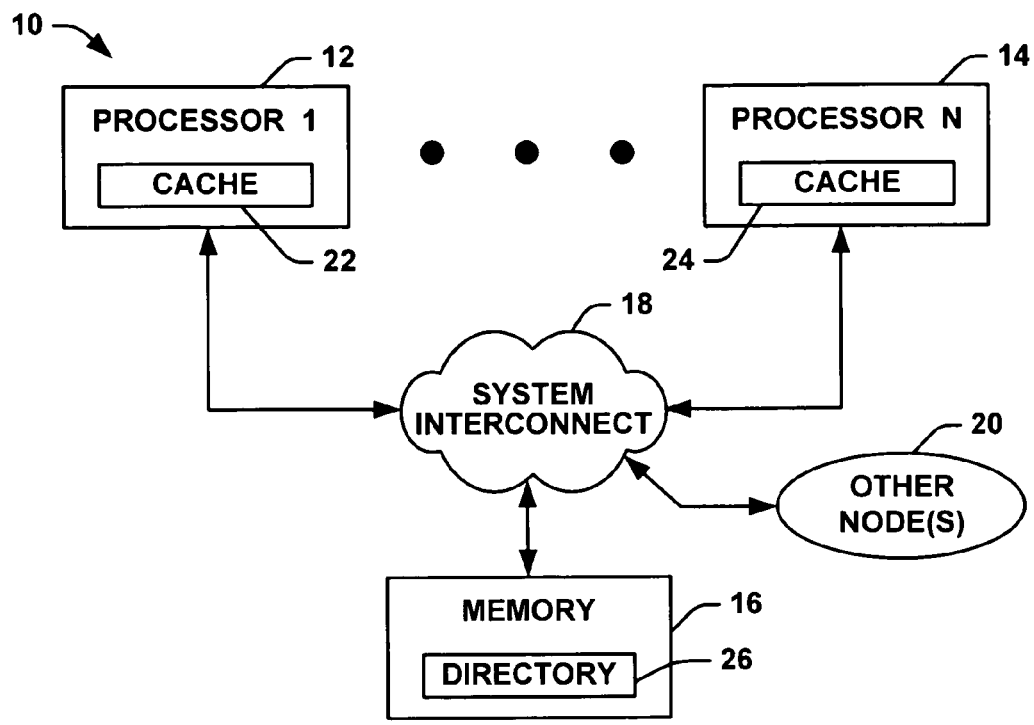
FIG. 1 depicts an example of a multiprocessor system.

FIG. 1 depicts an example of a system 10 that can employ speculative fills and backup to facilitate processor execution speed. Additionally, the system 10 can utilize a coherent signal to indicate which portion (e.g., field, block, quantum) of a given data fill is coherent. Furthermore, the system 10 can employ a coherent signal to indicate which of a plurality of responses to a plurality of requests have returned coherent copies of data fills. The system 10 illustrates a multi-processor environment that includes a plurality of processors 12 and 14 (indicated at PROCESSOR 1 through PROCESSOR N, where N is a positive integer (N>1)). The system 10 also includes memory 16, which can be implemented as a globally accessible aggregate memory. For example, the memory 16 can include one or more memory storage devices (e.g., dynamic random access memory (DRAM)).

The processors 12-14 and memory 16 define nodes in the system that can communicate with each other via requests and corresponding responses through a system interconnect 18. For example, the system interconnect 18 can be implemented as a switch fabric or a hierarchical switch. Also associated with the system 10 can be one or more other nodes, indicated schematically at 20. The other nodes 20 can correspond to one or more other multi-processor systems connected to the system interconnect 18, such as through an appropriate interconnect interface (not shown).

Each of the processors 12-14 includes at least one corresponding cache 22-24. For purposes of brevity, each of the respective caches 22-24 are depicted as unitary memory devices, although they may include a plurality of memory devices or different cache levels. Each of the caches 22-24 contains a plurality of cache lines. Each cache line has an associated address that identifies corresponding data stored in the line. The cache lines can also include information identifying the state of the data for the respective lines.

The system thus employs the caches 22-24 and the memory 16 to store blocks of data, referred to herein as "memory blocks" or "data fills". A memory block or data fill can occupy part of a memory line, an entire memory line or span across multiple lines. For purposes of simplicity of explanation, however, it will be assumed that a "memory block" occupies a single "memory line" in memory or a "cache line" in a cache. Additionally, a given memory block can be stored in a cache line of one or more caches as well as in a memory line of the memory 16.

The system 10 implements a cache coherency protocol to manage the sharing of memory blocks so as to guarantee coherence of data. The cache coherency protocol of the system 10 utilizes a plurality of states to identify the state of each memory block stored in a respective cache line and the memory 16. The coherency protocol establishes rules for transitioning between states, such as if data is read from or written to memory 16 or one of the caches 22-24.

As used herein, a node that issues a source request, such as a read or write request, defines a source node. Other nodes within the system 10 are potential targets of the request. Additionally, each memory block in the system 10 can be assigned a "home node" that maintains necessary global information and a data value for that memory block. The home node can be defined as a processor (or central processing unit), associated cache and associated memory/directory.

For example, when a source node, such as the processor 12, requires a copy of a given memory block, it typically first requests the memory block from its local, private cache by identifying the address associated with the memory block. If the data is found locally, the memory access is resolved without communication via the system interconnect 18. Where the requested memory block is not found locally, the source node 12 can request the memory block from the system 10, including the memory 16. In addition to the request identifying an address associated with the requested memory block, the request usually identifies the type of request or command being issued by the requester.

By way of example, assume that the processor 12 (a source node) requires a copy of data associated with a particular address, and assume that the data is unavailable from its own local cache 22. Since the processor 12 is unable to access the data in its local cache 22, the processor 12, as the source node, transmits a source request to other nodes and memory 16 via the system interconnect 18. For example, the request can correspond to a source read request or a source write request for a memory block associated with the address identified in the request. The request also can identify what type of request is being issued by source node 12.

In a directory based cache coherency protocol, the source request is transmitted from the source processor 12 to a home node in the system 10. The home node retains location information (e.g., in a directory) of the owner of the requested cache line. The home node provides a forward signal to the owner. The owner then responds with a coherent data fill, which is received by the requester. The system 10 can also return a coherent signal indicating that the coherent data fill is the coherent copy of the requested cache line. The coherent signal can be provided before, after or concurrently with the coherent data fill. Based on the type of request, the cache coherency protocol can continue executing to change states of one or more copies of the memory block in the system.

During execution of the cache coherency protocol, the requesting node is provided with one or more data fills associated with the memory block. The data fill is a copy of the memory block associated with a requested cache line. The data fill can be a speculative fill. A speculative fill is a data fill that may or may not be the latest version of the memory block. Speculative fills can be provided by a local cache, a local processor (e.g., within a multi-processor group), a remote processor, a home node or a speculative guess structure. The speculative guess structure can be implemented by employing a speculative table, speculative engine or separate cache structure that maintains speculative copies of memory blocks. The speculative fills allow the requesting processor to execute several thousands of program instructions ahead prior to receiving a coherent copy of the requested memory block.

Subsequent data fills can be provided to the requesting node until the coherent signal is received indicating which data fill is coherent. These subsequent data fills can be ignored. Alternatively, if the subsequent data fill is different from the speculative fill used by the source processor to continue execution, the processor can backup and re-execute program instructions. This may be the case if it is determined that a subsequent fill is more likely coherent than the original fill employed by the processor to continue execution.

Once the coherent signal is received, the source processor can determine whether the current speculative fill employed by the processor to continue execution is the same as the coherent data fill. If the coherent data fill is the same as the speculative fill, the processor can continue execution, thus mitigating latency caused by the processor remaining in an idle state until a coherent version of the requested memory block is received. If the coherent data fill is different from the speculative fill, the processor can back up and re-execute program instructions with the new data. The source then backs up and begins executing again with the new data, but loses little or no time from the execution of the speculative fill as the source would have remained latent during the retrieval of the coherent copy regardless. The cache coherency protocol can continue executing after the coherent copy is retrieved to change states of one or more copies of the memory block in the system based on the request (e.g., read, write) of the source.

Information associated with each source request is retained in the event of a processor backup. The source processor includes a cache system that can be set to a cache state and a register file system that can set to a register file state associated with a processor backup state in the event of execution with a speculative fill that is not coherent. The cache backup system includes a non-retired store cache that retains non-retired store data based on program instructions to store data into a data cache associated with a processor. The cache backup system can include a log that includes executed store entries for each store to the non-retired store cache, where each executed store entry includes a cache line address and store value associated with a given store to the non-retired store cache. The store entries can be removed from the log and written to the data cache if data of a speculative fill associated with the non-retired store data is determined to be coherent and prior memory references have been resolved. A pointer or index can be retained that points to a log such that store executed before a backup point can written to the data cache and stores executed after the backup point can be flushed from the log if a speculative fill is determined to be non-coherent, such that only coherent data is written to the data cache.

Additionally, a pointer or index can be retained that points to a backup of the register file or a log that retains information associated with the register file corresponding to the state of the register file at the backup point. If the processor employs an out-of-order pipeline, the register rename map that points to the backed up locations of the register file is operative to be reset during a processor backup. The source processor also stores information associated with the state of the processor pipeline when a first user program instruction associated with the requested data is encountered. The first user program instruction is the first program instruction that utilizes the data requested from the store or load instruction executed by the processor pipeline. The first user program instruction can be the backup point, such that the cache backup system and the register file system are set to a first user point for re-execution. Furthermore, the state of the register load files associated with each register load instruction prior to the first user program instruction and subsequent to the data request instruction can be retained, so that the registers can be reloaded with the new coherent data.

Figure 2:
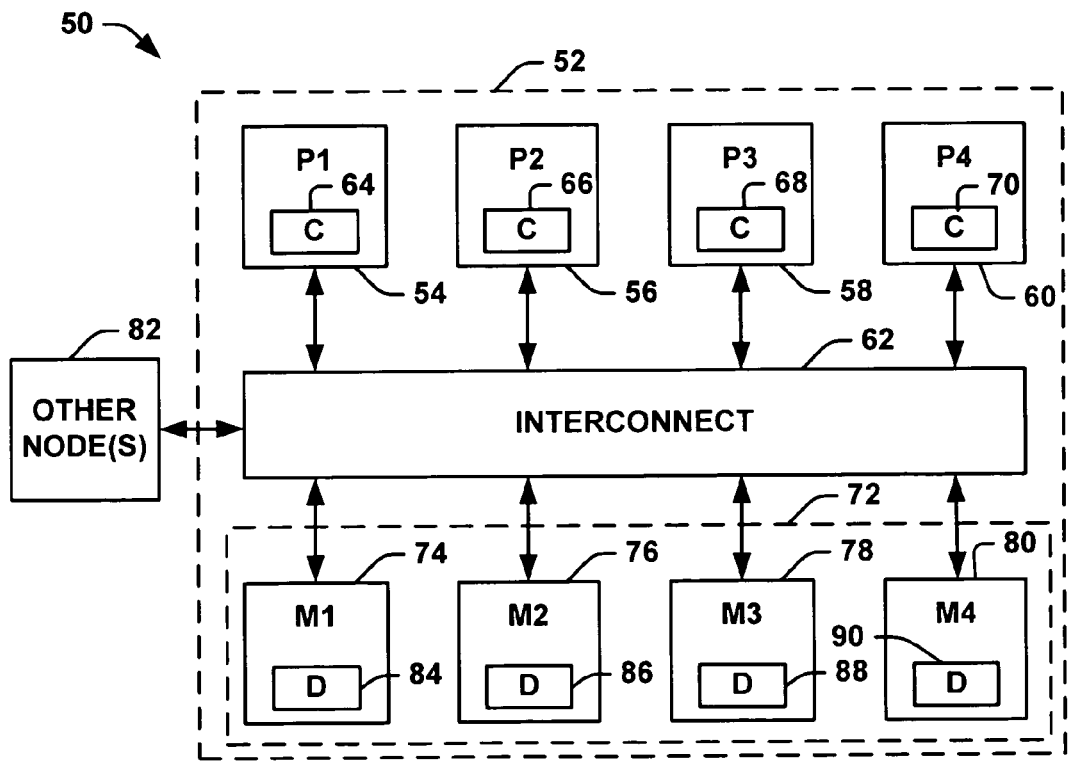
FIG. 2 depicts an example of another multiprocessor system.

FIG. 2 depicts an example of a multiprocessor computing system 50. The system 50, for example, includes an SMP (symmetric multi-processor) node 52 that includes processors (P1, P2, P3, P4) 54, 56, 58 and 60 in communication with each other via an interconnect 62. The interconnect 62 facilitates transferring data between processors and memory of the system 50. While four processors 54-60 are depicted in the example of FIG. 2, those skilled in the art will appreciate that a greater or smaller number of processors can be implemented in the node 52.

Each processor 54-60 also includes an associated cache 64, 66, 68 and 70. The caches 64-70 can enable faster access to data than from an associated main memory 72 of the node 52. The system 50 implements a cache coherency protocol designed to guarantee coherency of data in the system. By way of example, the cache coherency protocol can be implemented to include a directory based protocol in which requests for data are transmitted to a home node, which retains owner information in a directory associated with a given cache line. Alternatively, the cache coherency protocol can be implemented to include a source broadcast protocol in which a request is transmitted to all nodes in the system. Furthermore, a null-based protocol can be employed in which a home node receives a request and issues a source broadcast for the requested data.

The memory 72 can include multiple memory modules (M1, M2, M3, M4) 74, 76, 78 and 80. For example, the memory 72 can be organized as a single address space that is shared by the processors 54-60 as well as other nodes 82 of the system 50. Alternatively, each memory module 74-80 can be associated with a respective one of the processors 54-60. Each of the memory modules 72-78 can include a corresponding directory 84, 86, 88 and 90 that defines how the memory blocks are apportioned in each respective module as well as where the corresponding coherent copy of data should reside in the system 50. The coherent copy of data, for example, may reside in the home memory module or, alternatively, in a cache of one of the processors 54-60.

The other node(s) 82 can include one or more other SMP nodes associated with the SMP node 52 via the interconnect 62. For example, the interconnect 62 can be implemented as a switch fabric or hierarchical switch programmed and/or configured to manage transferring requests and responses between the processors 54-60 and the memory 70, as well as those to and from the other nodes 82.

When a processor 56 requires desired data, the processor 56 operates as a source node and issues a source request (e.g., a read request or write request) to the system 50. In a directory based protocol, a home node responds to the request by providing a forwarding signal to an owner processor. The owner processor returns a coherent copy of the data fill. The cache coherency protocol implemented in the system 50 is designed to ensure that a correct copy of the data is returned in response to the source request. The system 50 can also return a coherent signal that indicates that the copy returned from the owner processor is the coherent version of the requested data.

Furthermore, the source processor can receive speculative copies or fills of the requested data in response to the source request. The source processor can employ the speculative copy to execute several thousands of instructions ahead prior to receiving a coherent version of the data. Speculative fills can be provided by a local processor (e.g., within a multi-processor group), a remote processor, a home node or a speculative guess structure, such as a speculative table, speculative engine or separate cache structure that maintains speculative copies of memory blocks. Subsequent data fills can be provided to the requesting node until the coherent signal is received indicating which data fill is coherent. These subsequent data fills can be ignored. Alternatively, if a subsequent data fill is different from the speculative fill used by the source processor to continue execution, the processor can backup and re-execute program instructions. This may be the case if it is determined that a subsequent fill is more likely coherent than the original fill employed by the processor to continue execution.

Each processor retains backup information associated with each source request in the event of a processor backup. Each source processor includes a cache system that can backup or be set to a backup point and a register file system that can backup or be set to a backup point in the event of execution with a speculative fill that is not coherent. A pointer or index can be retained that points to a backup point of the cache system or a log that retains information associated with the cache state at the backup point if a processor executes with a non-coherent speculative data fill.

For example, the cache backup system can include a non-retired store cache that retains non-retired store data in non-retired store cache entries based on program instructions to store data into a data cache associated with a processor. The cache backup system can include a log that includes executed store entries for each store to the non-retired store cache, where each executed store entry includes a cache line address and store value associated with a given store to the non-retired store cache. The executed store entries can be removed from the log and written to the data cache (e.g., retired) if data of a speculative fill associated with the non-retired store data is determined to be coherent and prior memory references have been resolved. The pointer or index can be retained that points to the log such that executed store entries before a backup point can be written to the data cache and retired, and executed store entries after the backup point can be flushed from the log if a speculative fill is determined to be non-coherent, such that only coherent data is written to the data cache. The backup point can be a first user point associated with a first user program instruction, which is a first program instruction that employs data from an associated speculative fill.

Additionally, a pointer or index can be retained that points to a backup point of the register file or a log that retains information associated with the register file at a backup point if the processor executes with a non-coherent speculative data fill. If the processor employs an out-of-order pipeline, the register rename map that points to the backed up locations of the register file is operative to be reset during a processor backup. The source processor also stores information associated with the state of the processor pipeline when a first user program instruction associated with the requested data is encountered. Furthermore, the state of the register load files associated with each register load instruction prior to encountering the first user program instruction can be retained, so that the registers can be reloaded with the new coherent data to be set in a state associated with the backup point.

Once a coherent data fill is received in response to a source request, the source processor can determine whether the current speculative fill employed by the source processor is the same as the coherent data fill. If the coherent data fill is different from the speculative fill, the processor can back up and re-execute program instructions with the new data. The processor can back up its associated pipeline by backing up the program counter to the first user program instruction, backing up the cache via the backup pointer or index to the cache backup system, and backing up the register file via the backup pointer or index to the register file backup system. Additionally, loaded register files can be reloaded with the coherent fill data. If the pipeline is an out-of-order pipeline, the register rename map can be reset. If the coherent data fill is the same as the speculative fill, the processor can continue execution of new program instructions without backing up.

In an alternate embodiment, a comparison is performed between bytes of the coherent data fill and the speculative fill that are employed by the processor pipeline. If none of the bytes employed by the processor pipeline are different between the speculative fill and the coherent data fill, the coherent data fill is not sent to the processor pipeline and no backup occurs. If bytes employed by the processor pipeline are different between the speculative fill and the coherent data fill, the coherent data fill is sent to the processor pipeline and a backup occurs.

Figure 3:
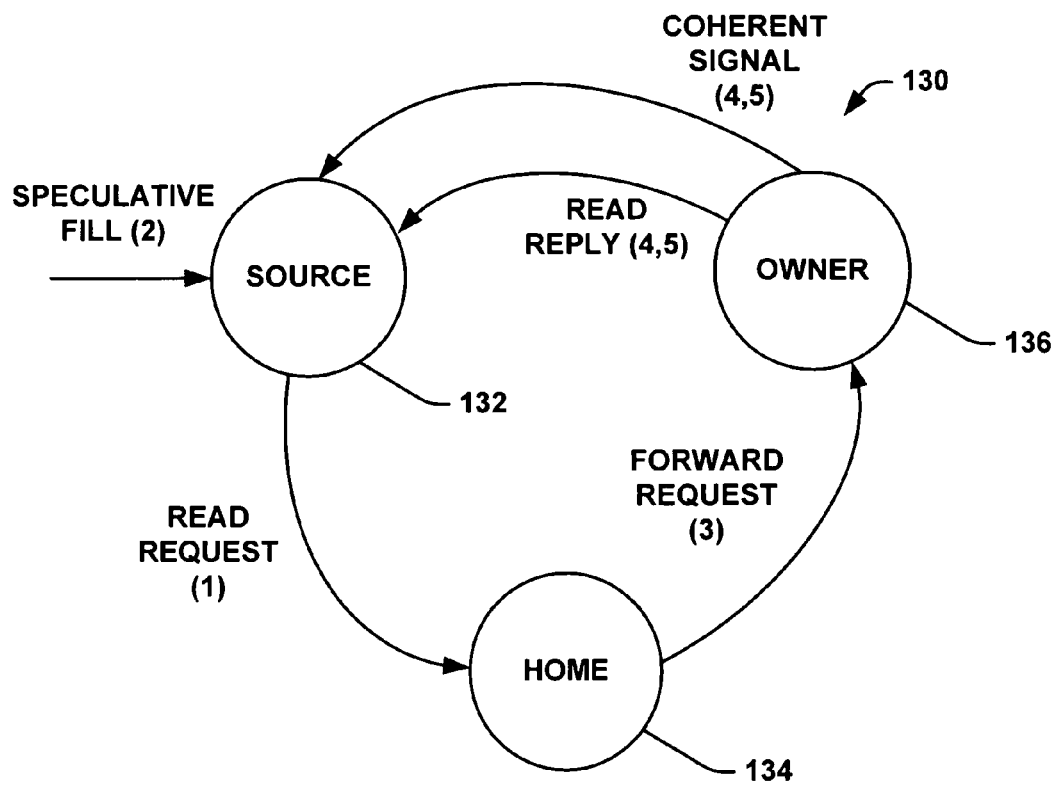
FIG. 3 illustrates a system diagram associated with a source read request.

FIG. 3 illustrates a system diagram 130 associated with a source read request in the event of a cache miss in a multi-processor system. The system diagram includes reference numerals (1-5) that indicate one or more communication orders associated with the system diagram. A source node or processor 132 initiates a read request, which is received by a home node 134. The home node 134 retains information indicating the owner of the requested cache line. This information is stored in a directory in memory associated with the home node 134. The source read request is also received by one or more other entities and/or structures of the multi-processor system.

For example, one or more local processors (e.g., a processor part of a multi-processor group or node), a remote processor, or some other local or remote structure residing in a multi-processor group with the source. At least one or more of these other entities and/or structures provide copies of the requested cache line to the source. The copies of the requested cache line are referred to as speculative fills, since it is not known at this time whether or not these copies are coherent. One of the speculative fills are employed by the source processor to continue executing its program instructions. The source processor also retains information to allow the processor pipeline to backup in the event the speculative fill employed by the processor pipeline is not coherent.

The multi-processor system continues execution of its cache coherency protocol, while the source processor executes with the speculative fill. The home node 134 determines the owner 136 of the cache line requested from a home directory. The owner 136 of the cache line is the node or processor that has the latest version of the cache line. The latest version of the cache line can reside in a cache associated with a local or remote processor, or the latest version of the cache line can reside in memory. The owner can be a cache associated with a processor or a memory associated with the system or one or more processors. The home node 134 then provides a forward request to the owner 136. The owner 136 provides a read reply by providing a coherent copy of the requested data associated with the requested cache line to the source 132.

A coherent signal is provided to the source. The coherent signal is an indicator that provides an indication to the source that the copy provided by the owner is the coherent version of the cache line. In the example of FIG. 3, the coherent signal is provided by the owner. However, the coherent signal can be provided by control logic associated with the multi-processor system, by the home node 136 or by some other structure in the multi-processor system. The coherent signal can be a structure such as a data packet, or a tag associated with each data fill that is marked to indicate which of the data fills are coherent, or a tag associated with only the coherent version of the cache line. The coherent signal can be a mask or vector that indicated which portions (e.g., data fields, data quantums, data blocks) of a data fill are coherent. Additionally, the coherent signal can be a mask or vector that indicates which of a plurality of responses to a plurality of requests have returned coherent copies. The coherent signal can be sent prior to, after or concurrently with the coherent version of the cache line.

In response to the source receiving the coherent signal, a comparison is performed of the coherent fill and the speculative fill employed by the source to continue program execution. If the coherent data fill is different from the speculative fill, the source can back up the program counter to the first user program instruction, reset the cache, register files and register map to a backup point, reload the registers associated with the requested data and re-execute program instructions with the new coherent data. If the coherent data fill is the same as the speculative fill, the source can continue execution of program instructions, which can be several thousand instructions ahead of where the program would be without employing the speculative fill.

Alternatively, a comparison can be performed between bytes of the coherent data fill and the speculative fill that are employed by the processor pipeline. If none of the bytes employed by the processor pipeline are different between the speculative fill and the coherent data fill, the coherent data fill is not sent to the processor pipeline and no backup occurs. If bytes employed by the processor pipeline are different between the speculative fill and the coherent data fill, the coherent data fill is not sent to the processor pipeline and a backup occurs.

Figure 4:
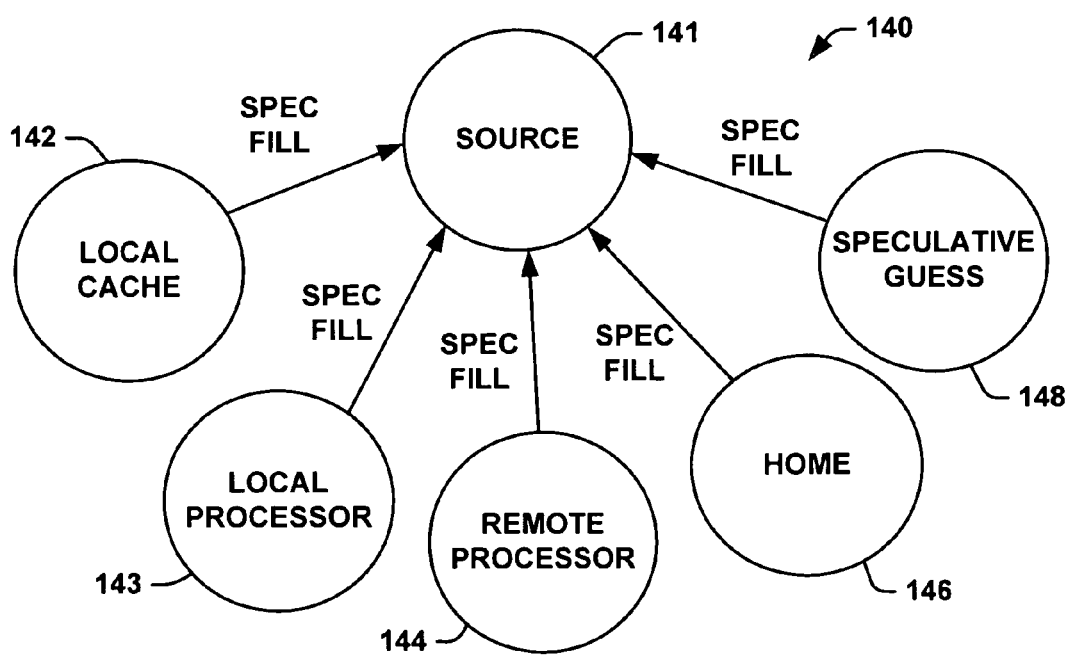
FIG. 4 illustrates a system diagram associated with a source node or processor receiving speculative fills.

FIG. 4 illustrates a system diagram 140 associated with a source node or processor 141 receiving speculative fills in response to a source request in the event of a cache miss in a multi-processor system. The source node or processor 141 can receive speculative fills from a local cache 142. The local cache 142 may have a copy of the memory block, which may or may not be the same as the coherent version residing somewhere in the multi-processor. This can occur in an upgrade miss, which by definition means that there is already a copy of the memory block in the local cache 142, such that the copy of the memory block can serve as a speculative fill. When the upgrade miss returns, a coherent signal will occur if the upgrade occurred to the value that was already present in the cache. If a new value is obtained, the new value will cause the source 141 to backup and re-execute program instruction with the new value.

Another example, is a full-block write where by definition all data values in a memory block associated with a cache line are going to be written by the execution stream. In this example, the system returns an acknowledgement that the line is coherent (all other copies have been invalidated). Similar to upgrade misses, the source begins executing upon receiving a full-block miss. When the system returns a coherent signal, the coherent signal is passed to the source 141 to allow instructions to start retiring.

The source node or processor 141 can receive speculative fills from a local processor 143. A local processor 143 is a processor that is within a node or multi-processor group with the source 141. The local processor 143 may have a copy of the cache line in its cache, which may be a stale version or a coherent version. The local processor 143 can provide this copy in the form of a speculative fill to the source. Additionally, a speculative fill can be provided by a remote processor 144 that can provide a speculative fill prior to the time necessary in providing the coherent fill. A remote processor is a processor that is not within a node or multi-processor group with the source 141. A home node 146 or processor can also provide a speculative fill.

The multi-processor system can also include a speculative guess structure 148 operative to provide speculative fills. For example, the speculative guess structure 148 can be a speculative engine can be employed to provide speculative fills in response to source requests. The speculative engine can be a dedicated processor and/or memory that returns speculative copies of cache lines. The speculative guess structure 148 can be a storage structure local to the source processor 141 that maintains speculative copies of cache lines in a table or some other form. The speculative guess structure 148 can monitor cache copies transmitted over the system, such that the speculative fills are similar to a substantial portion of the coherent fills transmitted over the system.

Figure 5:
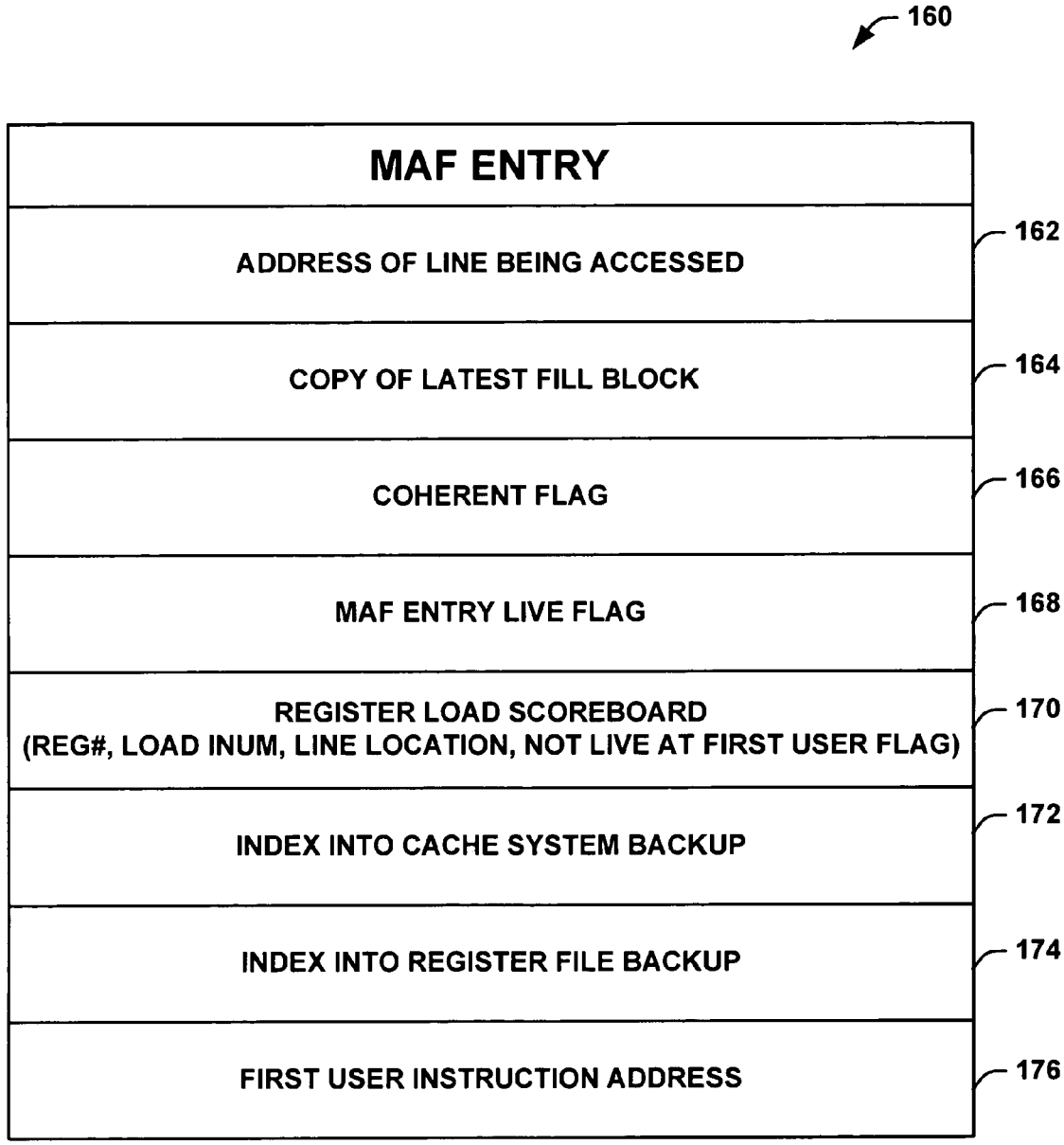
FIG. 5 illustrates a block diagram of a miss address file (MAF) entry.

FIG. 5 illustrates a block diagram of a miss address file (MAF) entry 160 that can be employed to initiate backup of a processor pipeline in the event of execution of a speculative fill that is not coherent. A MAF entry is generated by a source each time a source request for a new cache line is generated over the system. The MAF entry 160 contains fields associated with an outstanding request corresponding to a cache miss for a respective cache line. The MAF fields can include the cache line address being requested 162, the copy of the latest fill block 164 returned by the system and a coherent flag 166 that provides an indication of whether or not the coherent signal has been received.

The MAF entry 160 also includes fields for initiating a backup of the processor pipeline. The MAF entry 160 includes a MAF entry live flag field 168. The MAF entry live flag 168 indicates that a first user program instruction has been encountered by the processor pipeline. The first user program instruction is the first instruction that employs the requested data. The MAF entry 160 also includes a register load scoreboard 170. The register load scoreboard 170 includes entries for each register that is a destination of a load instruction prior to encountering the first user program instruction and subsequent to an instruction that causes the source request. Each entry in the scoreboard includes a register number, a load inum number which is a unique ascending number assigned at load time, a location in the cache line accessed by the load instruction associated with the respective register and a not live at first user flag. The not live at first user flag is a flag that indicates whether or not a register was overwritten before the first user program instruction has been encountered.

The MAF entry 160 also includes an index into the cache backup system field 172. This index can be a pointer into a log or a cache backup file associated with the state of the local cache at a backup point. The MAF entry 160 also includes an index into the register file backup system field 174. This index can be a pointer into a log or a register backup file associated with the state of the register file at a backup point. The MAF entry 160 also includes the address of the first user program instruction field 176. The address of the first user program instruction can be employed to backup the program counter to the first user program instruction. The backup point of the cache backup system and the register file system can be associated with the state of the cache backup system and register file system at the first user program instruction.

The following program example illustrates a first user program instruction:
0001 Load R11, 12(R14) # Access address formed as 12+R14 (cache line 88000).
0002 Add R16, R12→R13
0003 Load R3, 24(R14) # Access 24+R14 (also in cache line at 88000)
0004 Sub R6, R7→R2
0005 Mov R3, R8 # First use of data from cache line 88000 (accesses R3)
0006 Xor R8, #16, R8
0007 CMP R8, R11, R13

In the above example, it can be assumed that a cache miss occurs with the Load R11 instruction in line "0001" and this initiates a MAF entry for cache line 88000. When the Load R3 instruction in line "0003" is encountered a miss will also occur and is in the same cache line 88000. So a scoreboard entry will be created for the Load R3. The Mov R3 instruction in line "0005" is the first program instruction that uses either R11 or R3 and hence is the first-user program instruction in this example. However, if the Load R3 in instruction "0003" was to a different cache line than Load R11 in line "001" then the first-user program instruction would be the CMP R8, R11 in line "0007" because that is the first one to use the R11 data.

Each time a new fill is received, the source determines if the data fill in the MAF entry 160 is the same as the speculative fill utilized by the source to continue execution. If the new fill is different, the source replaces the previous data fill with the new fill. If the subsequent data fill is different from the speculative fill used by the source processor to continue execution, the processor may backup and re-execute program instructions. This may be the case if it is determined that a subsequent fill is more likely coherent than the original fill employed by the processor to continue execution.

The source also checks to see if the state of the coherent flag 166 has changed indicating that the coherent signal has been received. Once the coherent flag 166 changes state, the source can compare the coherent fill 164 stored in the MAF entry 160 with the speculative fill used to continue execution of the processor to determine if execution should continue or whether the processor needs to re-execute the program instructions with the coherent data.

If the coherent data fill is different from the speculative fill, the source can load the cache with the coherent fill, reset the cache via the index into the cache backup system, reset the register file via the index into the register file backup system, reset the register rename map (e.g., for an out-of-order pipeline), reload the registers based on the register scoreboard, back up the program counter to the first user program instruction and re-execute program instructions with the new coherent data. If the coherent data fill is the same as the speculative fill, the source can continue execution of program instructions without the need to backup. Alternatively, a comparison can be performed of bytes from the speculative fill and the coherent fill associated with register loads in the register scoreboard. If the bytes are the same, the registers have been loaded with the correct values and a backup is not necessary. If the bytes are not the same, the registers have been loaded with the incorrect values and a backup is necessary.

Figure 6:
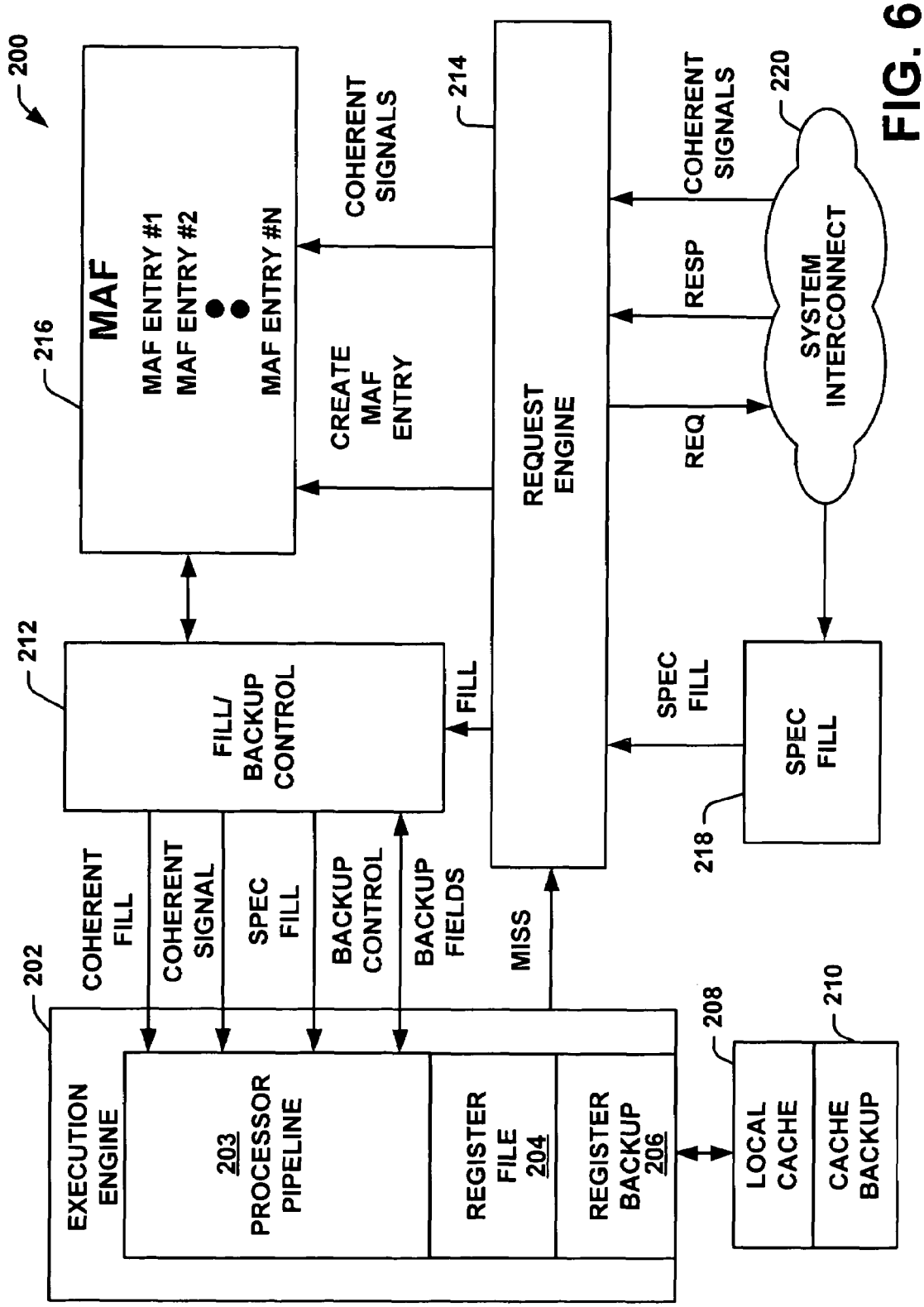
FIG. 6 depicts an example of a processor system.

FIG. 6 illustrates a processor system 200 that employs one or more MAF entries for processor speculation and backup in a multi-processor system. The system 200 includes an execution engine 202 that is executing instructions associated with a processor pipeline 203. During a load or store instruction, the execution engine 202 searches a local cache 208 to determine if the cache line associated with the load or store instruction resides in the local cache 208. If the cache line does not reside in the local cache 208, the execution engine 202 initiates a cache miss to a request engine 214. The request engine 214 determines if a previous MAF entry resides in a MAF 216. The MAF 216 can include N MAF entries, where N is an integer greater than or equal to one. Each MAF entry is associated with a source request for a cache line.

If a MAF entry associated with the cache line corresponding to the load or store instruction resides in the MAF 216, a previous unresolved source request has been issued over the system. If the processor instruction is a load instruction, the register associated with the load instruction is added to the register scoreboard associated with the previously unresolved MAF entry. Each entry in the register scoreboard includes a register number, a load inum number which is a unique ascending number assigned at load time, a location in the cache line accessed by the load instruction associated with the respective register and a not live at first user flag. The not live at first user flag is a flag that indicates whether or not a register was overwritten before the first user program instruction has been encountered.

If a MAF entry associated with the cache line corresponding to the load or store instruction does not reside in the MAF 216, the request engine 214 creates a new MAF entry and issues a source request over the system via a system interconnect 220. A MAF entry can be implemented as a table, an array, a linked list or other data structure programmed to manage and track requests for each cache line. The MAF entry includes fields that identify, for example, the address of the data being requested, the type of request, and response information received from other nodes in response to the request. The request engine 214 thus employs a MAF 216 having one or more MAF entries to manage requests issued by the request engine 214 as well as responses to such requests.

The MAF entry associated with a given source request also includes fields for initiating a backup of a processor pipeline. The MAF entry includes a MAF entry live flag field. The MAF entry live flag indicates that a first user program instruction has been encountered by the processor pipeline. The first user program instruction is the first instruction that employs the requested data. The MAF entry also includes an index into a cache backup system 210. This index can be a pointer into a log or a cache backup file associated with the state of the local cache 208 at a backup point, for example, associated with the first user program instruction.

The cache backup system 210 can include a non-retired store cache that retains non-retired store data based on program instructions to store data into a data cache associated with the processor 200. The cache backup system 210 can also include a log that includes executed store entries for each store to the non-retired store cache, where each store entry includes a cache line address and store value associated with a given store to the non-retired store cache. The executed store entries can be removed from the log and written to the data cache (e.g., retired) if data of a speculative fill associated with the non-retired store data is determined to be coherent and prior memory references have been resolved. The pointer or index can be retained that points to the log such that executed store entries before a backup point can written to the data cache, and the executed store entries after the backup point can be flushed from the log if a speculative fill is determined to be non-coherent, such that only coherent data is written to the data cache. The backup point can be associated with the state of the cache at a first user program instruction, which is a first program instruction that employs data associated with a corresponding speculative fill.

The MAF entry also includes an index into a register file backup system 206. This index can be a pointer into a log or a register backup file associated with the state of a register file 204 at a backup point. The MAF entry also includes the address of the first user program instruction. The address of the first user program instruction can be employed to backup the program counter to the first user program instruction.

A speculative fill is provided to the request engine 214 by a speculative fill structure 218 in response to a source request. The speculative fill structure 218 can be a tagless relatively large cache-like structure local or remote to the system 200. If the speculative fill structure 218 has a substantial number of entries (e.g., 32 times more entries than the local cache 204), the speculative fill structure 218 will have relatively good accuracy and a large number of speculative fills will be coherent. The entries in the speculative fill structure can be obtained by monitoring cache lines transmitted over the multi-processor system.

The speculative fill is stored in a copy of latest fill block field in the MAF entry associated with the corresponding source request via the request engine 214. A fill/backup control component 212 retrieves a copy of the speculative fill from the MAF entry and provides the speculative fill to the processor pipeline 203. The processor pipeline 203 employs the speculative fill to continue execution of program instructions. As new fills are received from the system, the fill/backup control component 212 compares the new fills with the copy of latest fill block field of the MAF entry. If the new fill is different, then the copy of the latest fill is overwritten with the new fill. These subsequent data fills can be ignored by the processor pipeline, until a coherent signal is received. Alternatively, if the subsequent data fill is different from the speculative fill used by the source processor to continue execution, the processor can backup and re-execute program instructions. This may be the case if it is determined that a subsequent fill is more likely coherent than the original fill employed by the processor to continue execution.

The fill/backup control 212 also provides an interface between the processor pipeline 203 and the MAF entry. The fill/backup control 212 analyzes the processor instructions and updates backup fields associated with the MAF entry. For example, the fill/backup control 212 will receive backup field updates such as the address of the first user program instruction for an associated source request. The fill/backup control 212 will store the address of the first user program instruction in the first user program instruction field and set the MAF entry live flag. The MAF entry live flag provides an indication that the first user program instruction has been encountered and that a coherent fill that does not match the speculative fill will cause a processor instruction backup. The fill/backup control 212 will determine subsequent load instructions after the instruction that causes the source request and prior to the first user program instruction. The fill backup control 212 will store the register number, the inum of the load, the location in the line accessed by the load instruction and set the not live at first user flag if the register has been overwritten by another instruction before the first user program instruction, and reset the not live at first user flag if the register has not been overwritten by another instruction before the first user-instruction. The fill/backup control 212 will also receive and store in the MAF entry an index into the cache backup system 210 and an index into the register backup system 206.

The fill/backup control component 212 monitors a coherent flag field in the MAF entry to determine if the coherent flag has changed state, which is an indication that the coherent signal has been received. Once the coherent signal is received from the system, the request engine 214 changes the state of the coherent flag field in the MAF entry.

The fill/backup control 212 detects the change in the state of the coherent fill and retrieves a copy of the latest fill block, which corresponds to the coherent version of the data fill. The fill/backup control 212 then compares the speculative fill provided by the fill/backup control 212 to the processor pipeline 203 with the coherent fill. If the coherent data fill is different from the speculative fill and the MAF entry live flag is set, the fill/backup control 212 provides the coherent fill to the processor pipeline 203. The fill/backup control 212 resets the program counter with the first user program instruction address, backs up the cache backup system 210 via the index into the cache system, backs up the register file backup 206 via the index into the register file backup and loads the new fill into the local cache 208. The fill/backup control 212 then loads the registers in the register scoreboard with data from the coherent fill, except registers that have a not live at first user flag set. Additionally, other MAF entries are examined and any scoreboard entries or first-user instructions occurring later than the backup point are removed for the respective MAF entries. The processor pipeline 203 can then begin executing program instructions again with the new coherent data.

If the coherent data fill is the same as the speculative fill, the fill/backup control 212 provides the coherent signal to the processor pipeline 203 indicating that the processor pipeline 203 has already been provided with the coherent data. The processor pipeline 203 can continue execution, until another load or store instruction is encountered. The MAF entry is then removed from the MAF 216. Although the fill/backup control 212 is illustrated as a single functional element, it is to be appreciated that the fill/backup control 212 can be one or more functional elements, such as a separate fill control and a separate backup control.

Alternatively, speculative and coherent data associated with register loads in the register scoreboard can be compared to determine if any of the registers have been loaded with non-coherent data. If the registers have been loaded with non-coherent data, then the processor is backed up as discussed above. Otherwise, the processor can continue execution with the speculative fill.

It is to be appreciated that any probes from the system, will only see data changes by truly coherently retired stores and will not see any data from stores executed based on a speculative fill. That is probes will only see data in the local cache 208 and not data residing in the cache backup system 210. Additionally, any fence or memory barrier instruction will cause the pipeline to drain such that no memory reference after a fence or barrier will be executed until all coherent data has been resolved. Furthermore, any read or write to an input/output (I/O) control status register (CSR) will cause the pipeline to drain due to side effects associated with I/O CSRs.

Figure 7:
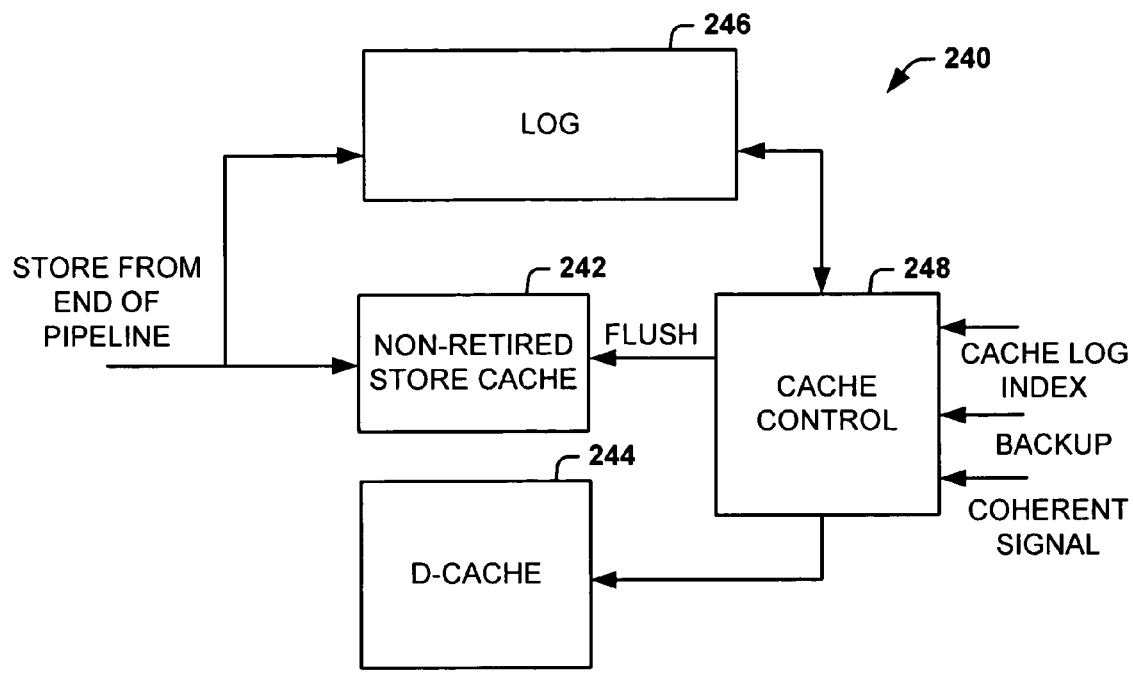
FIG. 7 illustrates a block diagram of a store portion of a cache backup system associated with an in-order pipeline.

FIG. 7 illustrates a store portion 240 of a cache backup system associated with an in-order pipeline. The store portion 240 of the cache backup system includes a non-retired store cache 242, a log 246 and a cache control 248. Store data associated with store instructions from an end of a processor pipeline is written into the non-retired store cache 242. The processor pipeline will look into the non-retired store cache 242 to determine if an address of a store cache entry resides in the non-retired store cache 242. If store cache entry does reside in the non-retired store cache 242, the value is overwritten and a counter associated with the store cache entry is incremented. The value of the counter determines the number of stores to a store cache entry. If a store cache entry does not reside in the non-retired store cache 242, a store cache entry is allocated and a counter associated with the new store cache entry is set to one. The counter serves as a line-is-valid signal. A counter value greater than zero indicates the entry in the store-cache is valid. A counter value of zero indicates that the line is invalid, such that the processor pipeline can employ this store cache entry for another store address.

The log 246 is a first-in-first-out (FIFO) (e.g., buffer) of executed store entries of addresses and store values that have been written into the non-retired store cache 242. The log 246 covers the stores that could be backed up because a prior speculative fill is determined to be non-coherent and a new coherent data fill is returned. The executed store entry exits the log 246 when a store is retired. A store is retired when it is determined that data from a speculative fill associated with the store is determined to be coherent and all prior memory references have been resolved. When the executed store entry exits the log 246, the store is written into a data cache 244, overwriting any older version of data. As the executed store entries exit the log 246, the corresponding counter value associated with the address of the cache store entry in the non-retired cache store is decremented. If the count value of a cache store entry in the non-retired cache store 242 reaches zero, the cache store entry is now available to be used by another store. If a cache miss occurs when storing an executed store entry in the data cache 244, a source request to the system is initiated to obtain write permission to the line in the data cache 244.

A cache control 248 interfaces with the log 246, the non-retired store cache 242 and the data cache 244. The cache control 248 receives signals from a backup/fill control system associated with the processor pipeline. The signals can include coherent signals that indicate that a given speculative fill is coherent. The cache control 248 can then remove executed store entries from the log 246 associated with the speculative fill, and write the store value to the store address in the data cache 244. The cache control 248 can also receive a backup signal that indicates that a speculative fill has been determined to be non-coherent and a cache index into the log 246 that points to a backup location associated with the log 246. The backup location can correspond to a first user point associated with a first user program instruction, which is a first program instruction that employs the associated non-coherent speculative fill. The index into the log 246 points to a location in the log 246 that separates stores that occur prior to the first user point and stores that occur after the first user point.

In the event of a backup, the cache control 248 will retire stores from the log 246 prior to the first user point, based on the cache log index, by writing these executed store entries into the data cache 244 and removing them from the log 246. The cache control 248 will then flush any executed store entries that occur after the first user point, based on the cache log index, from the log 246. The cache control 248 also flushes the non-retired store cache 242 of any store cache entries. The data cache 244 is then at a correct execution state associated with a first user program instruction.

Figure 8:
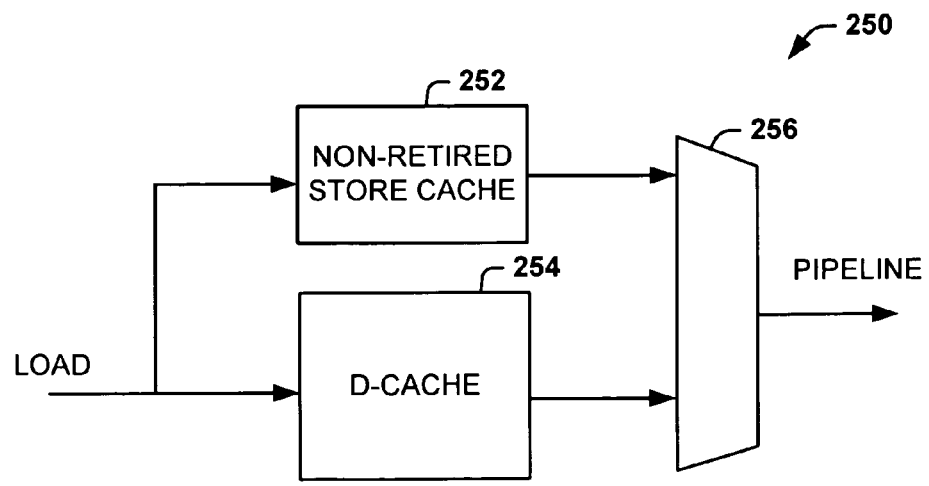
FIG. 8 illustrates a block diagram of a load portion of a cache backup system for an in-order pipeline.

FIG. 8 illustrates a load portion 250 of a cache backup system associated with an in-order pipeline. Execution of a load instruction causes a read by the processor pipeline of both a non-retired store cache 252 and a data cache 254. The non-retired store cache 252 and the data cache 254 can be read in parallel and provided to a multiplexer 256 that provides the desired value based on the non-retired store cache 252 having a higher priority than the data cache 254. For example, if a hit occurs in the non-retired cache 252, then the load value from the non-retired store cache 252 is employed by the processor pipeline overriding the value from the data cache 254. If a hit occurs in the data cache 254 and not the non-retired cache 252, then the load value from the data cache 254 is employed by the processor pipeline. If a miss occurs for both the non-retired cache 252 and the data cache 254, a source request is issued to the system.

Figure 9:
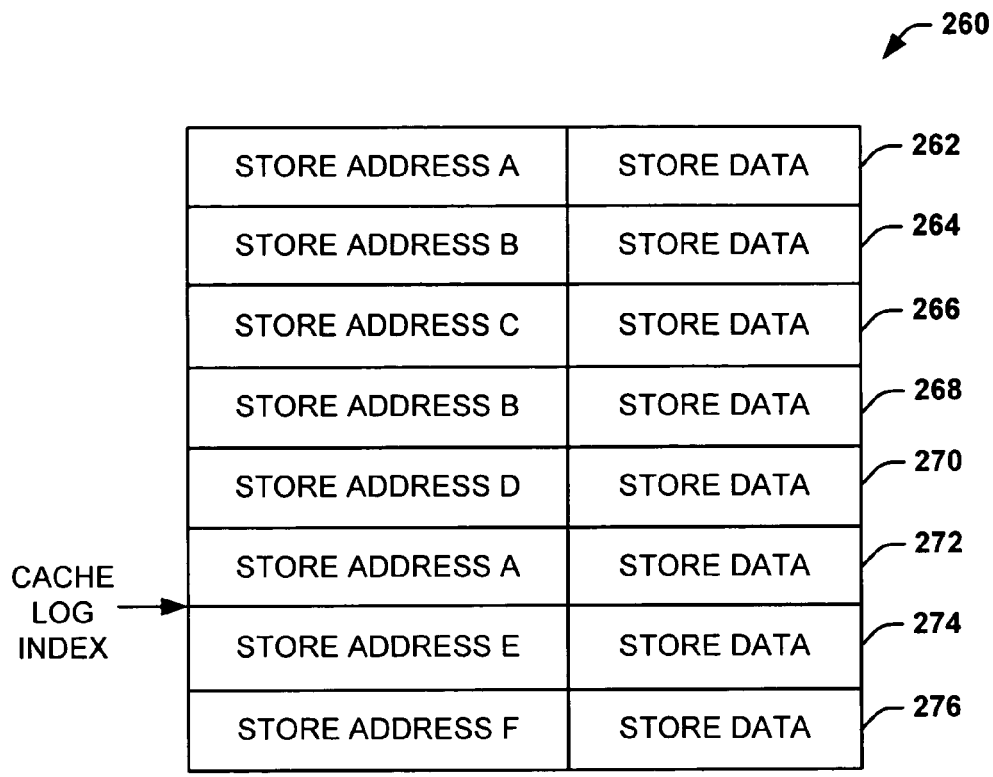
FIG. 9 illustrates a block diagram of a log having executed store entries.

FIG. 9 illustrates executed store entries associated with a log 260 of a cache backup system. The log 260 includes a plurality of executed store entries 262-276 corresponding to executed stores written into a non-retired store cache. The plurality of executed store entries occur in sequential order such that stores are retired in a first-in-first-out (FIFO) manner. Each store entry includes a store address and store data. The log 260 includes a first entry 262 associated with store data to store address A, a second entry 264 associated with store data to store address B, and a third entry 266 associated with store data to store address C. A fourth entry 268 corresponds to overwriting data at the store address B in the non-retired cache, such that the store value associated with address B contains new store data. The log 260 includes a fifth entry 270 associated with store address D. A sixth entry 272 corresponds to overwriting data at the store address A in the non-retired cache, such that the store value associated with address A contains new store data. The log 260 contains a seventh entry 274 associated with store data to store address E and an eighth entry 276 associated with store data to store address F.

A cache log index points to a backup point indicated between the sixth entry 272 and the seventh entry 274. The backup point can be associated with the state of the cache at a first user program instruction, which is a first program instruction that employs data associated with a corresponding speculative fill. If a backup occurs, executed store entries before the backup point are written to a data cache and store entries after the backup point are flushed from the log 260. In the log 260 illustrated in FIG. 9, the first through sixth entries (262-272) would be written to the data cache and removed from the log 260, and the seventh and eighth entries (274-276) would be flushed from the log 260 such that the data cache system would be at a program execution state associated with a first user program instruction corresponding to a non-coherent speculative fill.

Figure 10:
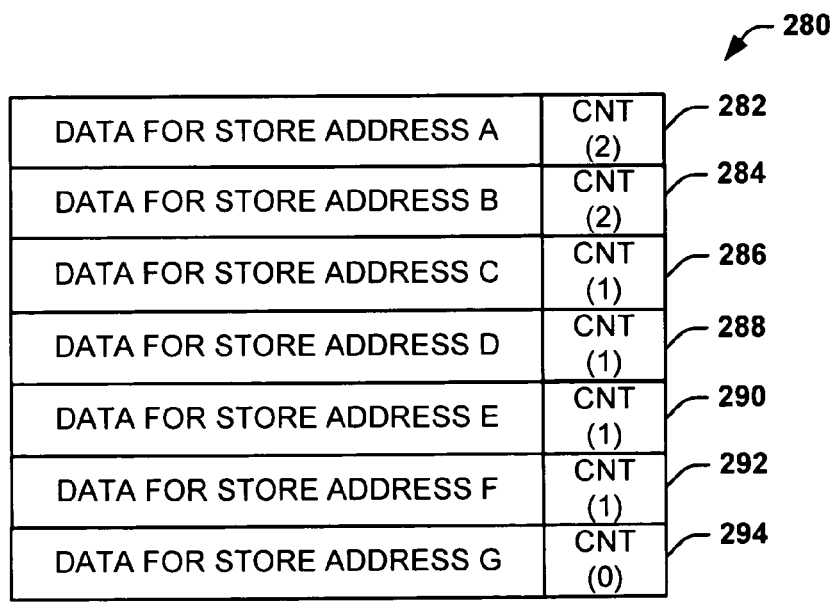
FIG. 10 illustrates a block diagram of a non-retired store cache having store cache entries.

FIG. 10 illustrates store cache entries associated with a non-retired store cache 280. The store cache entries in the non-retired store cache 280 correspond to logged executed store entries in the log 260 of FIG. 9. The store cache entries in the non-retired store cache 280 include single entries for each of the store addresses A-F. Each entry includes data corresponding to store data associated with a respective store address and a counter value. The counter value determines the number of stores to the respective store address that have not been retired.

For example, a first entry 282 contains data for store address A associated with a first and a second non-retired store to that address indicated by a count value of two of its associated counter. A second entry 284 contains data for store address B associated with a second store to that address indicated by a count value of two of its associated counter. A third entry 286 (store address C), a fourth entry 288 (store address D), a fifth entry 290 (store address E) and a sixth entry 292 (store address F) each have a respective count value of one indicating that a single non-retired store exists in the log 260 for that entry. A seventh entry 294 includes data for store address G, but has a counter value of zero indicating that the seventh entry is not valid and that all store entries in the log 260 associated with that address have been retired. As executed store entries for an address associated with a store cache entry are retired from the log 260, the respective counter is decremented. As store entries for an address associated with a store cache entry are added to the log 260, the respective counter is incremented. If a backup occurs, all entries in the non-retired cache 280 are flushed.

Figure 11:
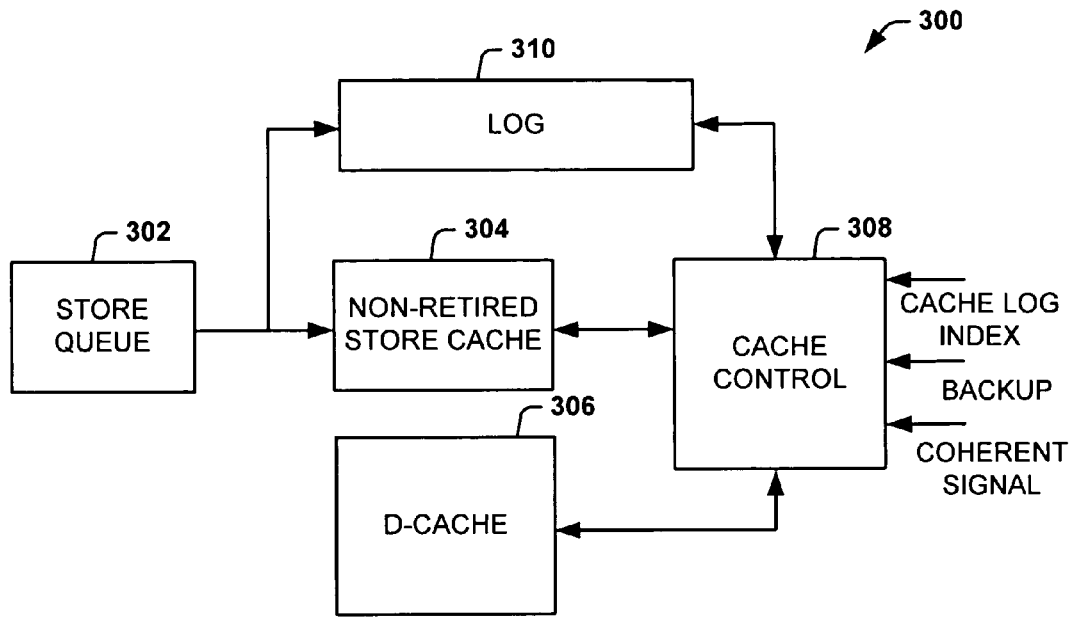
FIG. 11 illustrates a block diagram of a store portion of a cache backup system for an out-of-order pipeline.

FIG. 11 illustrates a store portion 300 of a cache backup system associated with an out-of-order pipeline. The cache backup system includes a non-retired store cache 304, a log 310 and a cache control 308. Store data associated with store instructions are received from a store queue 302 associated with a processor pipeline. Store instructions are not written into the non-retired store cache 304, until they leave the store queue 302. Store instruction do not leave the store queue 302 until the store instruction has passed the point that the store instruction could be replayed due to any out-of-order pipeline backup situations. An instruction that leaves the store queue 302 will overwrite a current address store cache entry and increment an associated counter if a store cache entry already exists for that store address. The value of the counter determines the number of stores to the store cache entry associated with a store address. If a store cache entry for the store address does not reside in the non-retired store cache 304, a new store cache entry is allocated and a counter associated with the new store cache entry is set to one.

The log 310 covers the stores that could be backed up because a prior speculative fill is determined to be non-coherent and a new coherent data fill is returned. An executed store entry exits the log 310 when a store is retired. A store is retired when it is determined that data from a speculative fill associated with the store is determined to be coherent and all prior memory references have been resolved. When the executed store entries exit the log 310, the store is written into the data cache 306, overwriting any older version of data. As the executed store entries exit the log 310, the corresponding counter value associated with the corresponding store cache entry in the non-retired cache store 304 is decremented.

A cache control 308 interfaces with the log 310, the non-retired cache 304 and the data cache 306. The cache control 308 receives signals from a backup/fill control system associated with the processor. The signals can include coherent signals that indicate that a given speculative fill is coherent. If the speculative fill is coherent, the cache control 308 can remove executed store entries associated with the speculative fill from the log 310, and write the store value to the store address in the data cache 306. The cache control 308 can also receive a backup signal that indicates that a speculative fill has been determined to be non-coherent, and a cache index into the log 310 that points to a backup point associated with the log 310.

In the event of a backup, the cache control 308 will retire executed store entries from the log 310 prior to the cache index, by writing these executed store entries into the data cache 306. The cache control 308 will then flush any stores that occur after the cache index, from the log 310. The cache control 308 also flushes the non-retired store cache 304 of any store entries.

Figure 12:
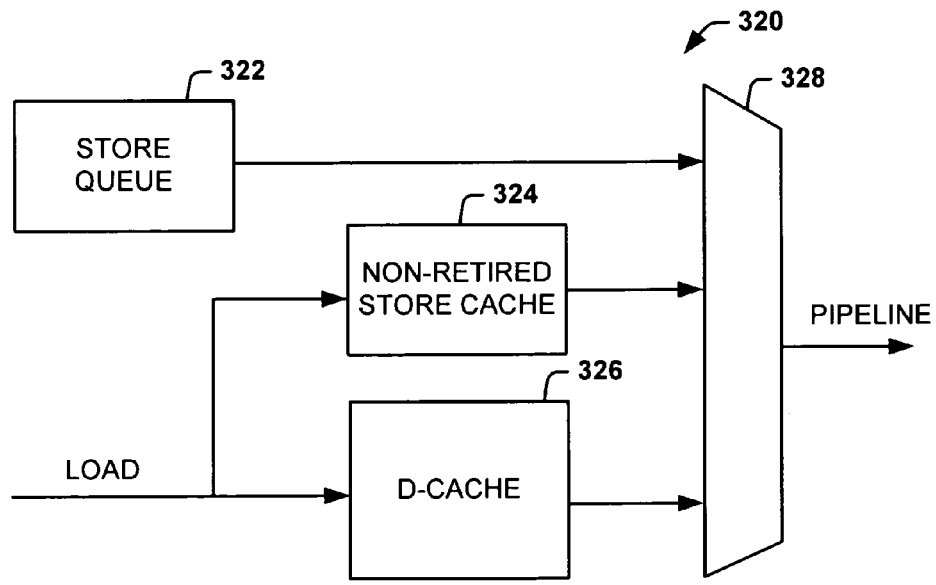
FIG. 12 illustrates a block diagram of a load portion of a cache backup system for an out-of-order pipeline.

FIG. 12 illustrates a load portion 320 of a cache backup system associated with an out-of-order pipeline. Execution of a load instruction causes a read by the processor pipeline of a store queue 322, a non-retired store cache 324 and a data cache 326. The store queue 322, the non-retired store cache 324 and the data cache 326 can be read in parallel and provided to a multiplexer 328 that provides the desired value based on priority. The store queue 322 has the highest priority, the non-retired store cache 324 has the next highest priority and the data cache 326 has the lowest priority. For example, if a hit occurs in the store queue 322, then the load value from the store queue 322 is employed by the processor pipeline overriding the value from the non-retired store cache 324 and the data cache 326. If a miss occurs in the store queue 322 and a hit occurs in the non-retired store cache 324, then the load value from the non-retired store cache 324 is employed by the processor pipeline overriding the value from the data cache 326. If a hit occurs in the data cache 326 and not the store queue 322 nor the non-retired cache 324, then the load value from the data cache 326 is employed by the processor pipeline. If a miss occurs for each of the store queue 322, the non-retired cache 324 and the data cache 326, a source request is issued to the system.

Figure 13:
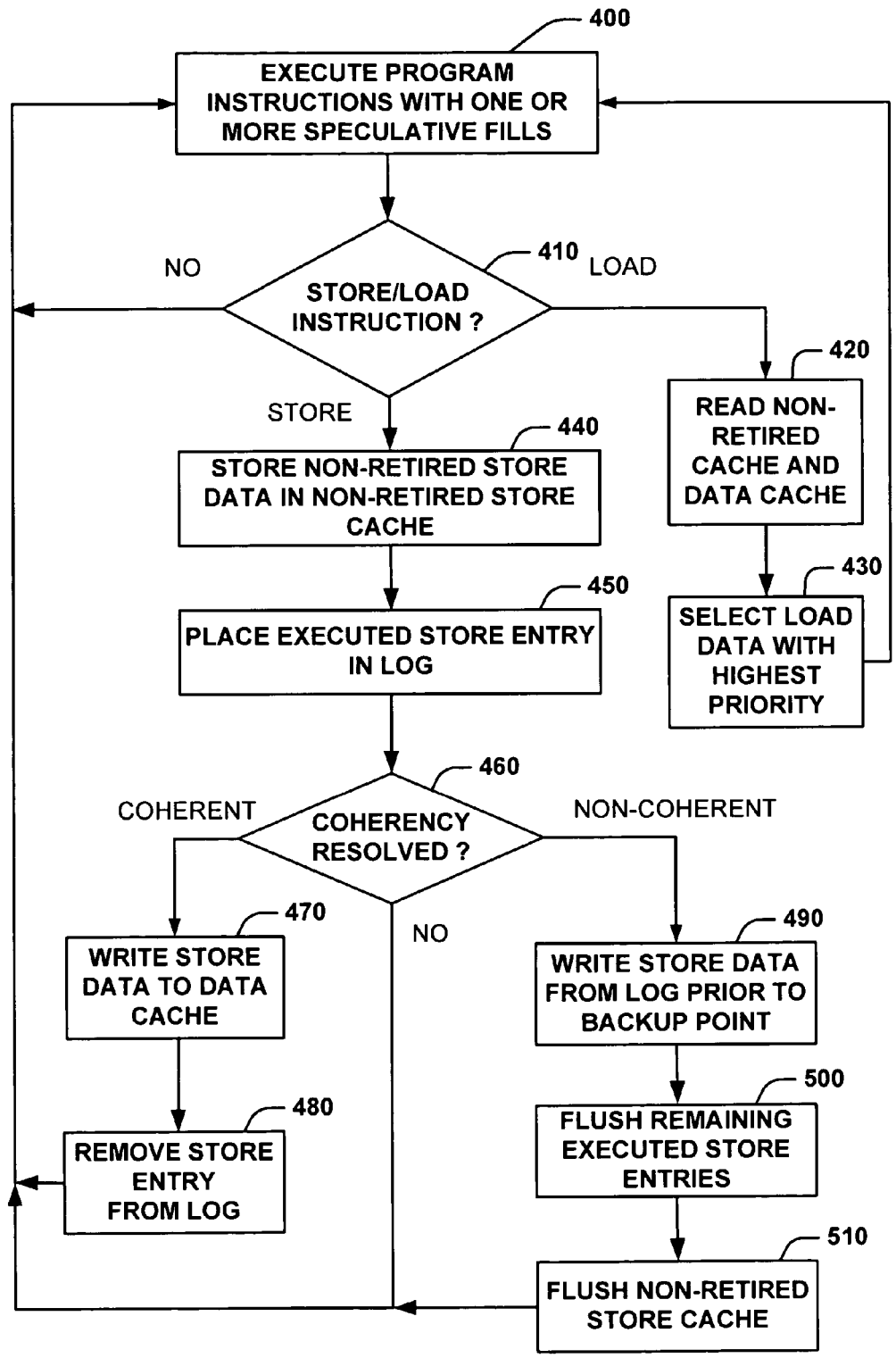
FIG. 13 depicts a flow diagram illustrating a method for executing a processor pipeline with speculative fills.
Figure 14:
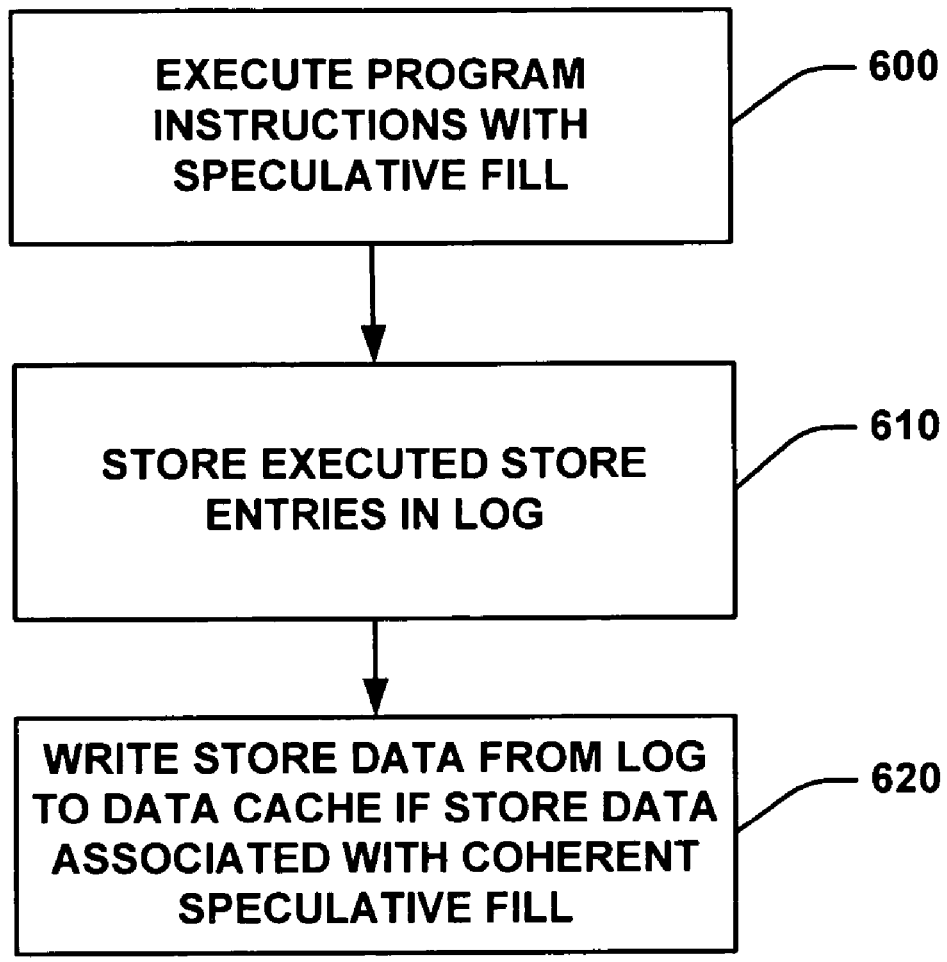
FIG. 14 depicts a flow diagram illustrating another method for executing a processor pipeline with speculative fills.

In view of the foregoing structural and functional features described above, certain methods will be better appreciated with reference to FIGS. 13-14. It is to be understood and appreciated that the illustrated actions, in other embodiments, may occur in different orders and/or concurrently with other actions. Moreover, not all illustrated features may be required to implement a method. It is to be further understood that the following methodologies can be implemented in hardware (e.g., as one or more integrated circuits or circuit boards containing a plurality of microprocessors), software (e.g., as executable instructions running on one or more processors), or any combination thereof.

FIG. 13 depicts a method for executing a processor pipeline with speculative fills. At 400, a processor executes program instructions with one or more speculative fills. The one or more speculative fills are provided in response to one or more source requests issued by the processor. A source request is issued when a load or store instruction results in a cache miss of a local processor cache. At 410, a determination is made on whether a store or load instruction has been encountered during program execution. If a store or load instruction has not been encountered (NO), the processor continues to execute program instructions at 400. If a load instruction is encountered (LOAD) at 410, the methodology proceeds to 420. At 420, a read is performed of both a non-retired store cache and a data cache. If the processor is an out-of-order pipeline, a read of a store queue associated with the out-of-order pipeline will also be performed. The methodology then proceeds to 430 to select load data with the highest priority. The load data from the store queue has a higher priority than the load data from the non-retired store cache and the data cache, while the load data from the non-retired store cache has a higher priority than the data cache.

If a store instruction is encountered (STORE) at 410, the methodology proceeds to 440. At 440, store data is stored in a non-retired store cache. The processor pipeline will look into the non-retired store cache to determine if an address of a store cache entry resides in the non-retired store cache. If store cache entry does reside in the non-retired store cache, the value is overwritten and a counter associated with the store cache entry is incremented. The value of the counter determines the number of stores to a store cache entry. If a store cache entry does not reside in the non-retired store cache, a store cache entry is allocated and a counter associated with the new store cache entry is set to one. The methodology the proceeds to 450.

At 450, a executed store entry is added to a log. The log can be a first-in-first-out (FIFO) (e.g., buffer) of executed store entries of addresses and store values that have been written into the non-retired store cache. The log covers the stores that could be backed up because a prior speculative fill is determined to be non-coherent and a new coherent data fill is returned. The methodology then proceeds to 460 to determine if any coherencies have been resolved for the one or more speculative fills. If any coherencies have not been resolved (NO), the methodology returns to 400 to continue executing program instructions.

If a speculative fill has been determined to be coherent at 460, the methodology proceeds to 470. At 470, executed store entries in the log associated with the coherent speculative fill are written to the data cache retiring the store instruction. At 480, the executed store entries in the log associated with the coherent speculative fill are removed from the log. The methodology returns to 400 to continue execution with one or more speculative fills.

If a speculative fill has been determined to be non-coherent at 460, the methodology proceeds to 490. At 490, executed store entries in the log prior to a backup point are written to the data cache and removed from the log. At 500, the executed store entries in the log after the backup point are flushed from the log. The backup point can be a first user point associated with a first user program instruction, which is the first program instruction that employs the speculative fill. At 510, the non-retired store cache is flushed. The methodology returns to 400 to continue execution with one or more speculative fills.

FIG. 14 depicts a method of executing program instructions employing a speculative fill in a multi-processor system. At 600, program instructions are executed with data from a speculative fill that is provided in response to a source request. At 610, executed store entries are stored in a log, each of the executed store entries comprising a store address and store data associated with a respective executed store instruction. At 620, store data associated with a respective executed store entry is written from the log to an associated store address in a data cache if data from the speculative fill associated with an executed store entry has been determined to be coherent.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A multi-processor system that conforms to a cache coherency protocol, the system comprising:
   a processor that transmits a source request for a data fill associated with a cache line in response to a cache miss, the processor having a processor pipeline that executes program instructions with data from at least one of a plurality speculative fills received from two or more other processors of the multi-processor system in response to a source request, the speculative fills being copies of a requested data fill that have undetermined coherency states; and
   a non-retired store cache that retains non-retired store data based on program instructions to store data into a data cache associated with the processor, the non-retired store data being written to the data cache if data of a speculative fill of the plurality of speculative fills associated with the non-retired store data is determined to be coherent, the processor pipeline initiating a the source request in response to a cache miss if a cache line in the data cache is not available before the non-retired store data is written to the data cache.

2. The system of claim 1, further comprising a log that includes executed store entries for each store to the non-retired store cache, each executed store entry including a cache address and a store value associated with a given store to the non-retired store cache, the executed store entries being removed from the log and written to the data cache if data of the speculative fill of the plurality of speculative fills associated with the non-retired store data is determined to be coherent and prior memory references have been resolved.

3. The system of claim 2, wherein the log is a first-in-first-out (FIFO) of cache addresses and store values that have been written into the non-retired store cache.

4. The system of claim 2, the non-retired store cache having a plurality of store caehe entries, each of the plurality of store cache entries having a corresponding counter that increments each time data is stored in the respective store cache entry and decrements each time an executed store entry associated with a respective store cache entry is removed from the log.

5. The system of claim 4, wherein a store cache entry of the non-retired store cache is valid if its associated counter has a non-zero value and the store cache entry is invalid if its associated counter has a zero value.

6. The system of claim 2, further comprising a cache control that receives an index into the log if data of the speculative fill of the plurality of speculative fills associated with the non-retired store data is determined to be non-coherent indicating a backup condition, the cache control writing executed store entries into the data cache until a point in the log indicated by the index is reached, the cache control flushing the remaining executed store entries from the log and flushing the store cache entries from the non-retired cache.

7. The system of claim 6, wherein the index points to a backup point associated with a first user program instruction, the first user program instruction being a first program instruction that employs data from the speculative fill of the plurality of speculative fills.

8. The system of claim 2, further comprising a request engine that generates a miss address file (MAF) entry associated with a source request, the MAE entry having a plurality of fields that retain backup information that is employed by a backup system in the event that a backup is initiated.

9. The system of claim 8, wherein the plurality of fields further comprises an index into the log, the index points to a backup point in the log associated with a first user program instruction, such that in the event of a backup, executed store entries prior to the backup point are written into the data cache and executed store entries after the backup point are flushed from the log, the first user program instruction being a first program instruction that employs data from at least one of the plurality of speculative fills.

10. The system of claim 1, wherein the processor pipeline reads the data cache and the non-retired cache in response to a load instruction, wherein the processor pipeline employs the data from the non-retired cache if the data resides in the non-retired cache and the processor pipeline employs the data from the data cache if the data does not reside in the non-retired cache and does reside in the data cache.

11. The system of claim 10, wherein the processor pipeline reads a store queue in addition to the data cache and the non-retired cache in response to a load instruction, wherein the processor pipeline employs the data from the store queue if the data resides in the store queue over the data in the non-retired cache and the data cache.

12. The system of claim 1, wherein the processor pipeline receives a coherent data fill from the multi-processor system after at least two speculative fills are received in response to the source request.

13. The system of claim 1, wherein the processor pipeline receives a coherent signal generated by the multi-processor system that provides an indication of which of a plurality of data fills received by the processor pipeline is a coherent data fill.

14. The system of claim 1, wherein the processor pipeline comprises one of an out-of-order pipeline and an in-order pipeline.

15. A processor in a multi-processor system that conforms to a cache coherency protocol, the processor comprising:
a request engine that transmits a source request for a data fill associated with a cache line in response to a cache miss;
a processor pipeline that executes program instructions with a given speculative data fill of a plurality of speculative data fills received from two or more other processors of the multiprocessor system in response to a source request, the speculative data fills being copies of a requested data fill that have undetermined coherency states; and
a cache backup system operative to set a data cache associated with the processor to a cache state corresponding to a previous processor pipeline execution state in the event that the given speculative data fill is determined to be non-coherent, wherein the previous processor pipeline execution state corresponds to a processor pipeline execution state at a first user program instruction, and the first user program instruction corresponds to a first program instruction that employs the given speculative data fill data associated with the source request.

16. The processor of claim 15, wherein the multi-processor system employs a cache coherency protocol that causes the system to generate a coherent signal that provides an indication of which of a plurality of data fills received by the processor pipeline is a coherent data fill, the processor employing the coherent signal to determine if the given speculative data fill is non-coherent.

17. The processor of claim 15, the cache backup system comprising:
a non-retired store cache, the processor pipeline storing data associated with store instructions to the data cache in store cache entries in the non-retired store cache; and
a log that includes a plurality of executed store entries corresponding to stores into the non-retired store cache, the executed store entries being written into the data cache when data from a speculative data fill associated with the executed store entry has been determined to be coherent.

18. The processor of claim 17, the non-retired store cache having a plurality of store cache entries, each of the plurality of store cache entries having a corresponding counter that increments each time data is stored in the respective store cache entry and decrements each time an executed store entry associated with a respective store cache entry is removed from the log.

19. The processor of claim 15, further comprising an index that points to a backup point into a log, the backup point being associated with a first user program instruction, which is the first program instruction that employs data from the given speculative data fill, wherein the executed store entries prior to the backup point are written to the data cache and the executed store entries after the backup point are flushed from the log in the event the given speculative data fill is determined to be non-coherent.

20. The processor of claim 15, wherein the processor pipeline reads the data cache and the non-retired cache in response to a load instruction, the processor pipeline selects data from the non-retired cache over the data cache.

21. The processor of claim 20, wherein the processor pipeline reads a store queue in addition to the data cache and the non-retired cache in response to a load instruction, and the processor pipeline selects data from the store queue over the non-retired cache and the data cache.

22. A multi-processor system that employs a cache coherency protocol, the system comprising:
- means for transmitting a source request for a data fill associated with a cache line in response to a cache miss;
- means for executing program instructions employing given speculative data fill of a plurality of speculative data fills received from two or more other processors of the multi-processor system in response to the source request, the plurality of speculative data fills being copies of the requested data fill that have undetermined coherency states;
- means for storing executed store entries associated with program store instructions executed by the means for executing;
- means for retiring the executed store entries by writing the executed store entries into a data cache if a the given speculative data fill associated with the executed store entry is determined to be coherent; and
- means for setting the data cache to a backup point if the given speculative data fill is determined to be non-coherent.

23. The system of claim 22, the means for setting the data cache to a backup point if the given speculative data fill is determined to be non-coherent comprising means for retiring the executed store entries from the means for storing to the backup point and flushing the executed store entries from the means for storing after the backup point.

24. The system of claim 22, further comprising means for storing non-retired store cache entries for store instructions executed by the means for executing.

25. The system of claim 24, further comprising means for providing an indication of which of a plurality of data fills associated with a source request is a coherent data fill.

26. A method of executing program instructions employing a speculative fill in a multi-processor system that conforms to a cache coherency protocol, the method comprising:
- transmitting source requests for data fills associated with cache lines in response to cache misses;
- executing program instructions with data from a given speculative fill of a plurality of speculative fills received from two or more other processors of the multi-processor system in response to a source request, the plurality of speculative fills being copies of the requested data fill that have undetermined coherency states;
- storing executed store entries in a log, each of the executed store entries comprising a store address and store data associated with a respective executed store instruction; and
- writing store data associated with a respective executed store entry from the log to an associated store address in a data cache if data from the given speculative fill associated with an executed store entry has been determined to be coherent.

27. The method of claim 26, further comprising setting a data cache to a backup point if the given speculative fill is determined to be non-coherent by writing executed store entries from the log to the data cache prior to the backup point and flushing the executed store entries from the log after the backup point.

28. The method of claim 27, further comprising generating a miss address file (MAD) entry associated with the source request, and storing an index that points to the backup point in the MAF entry.

29. The method of claim 27, the backup point being associated with a first user program instruction, which is a first program instruction that employs data from the given speculative fill.

30. The method of claim 26, further comprising storing data associated with an executed store instruction in a store cache entry in a non-retired store cache.

31. The method of claim 30, further comprising:
- incrementing a counter associated with a respective store cache entry when an executed store entry associated with the respective store cache entry is added to the log; and
- decrementing the counter associated with the respective store cache entry when an executed store entry associated with the respective store cache entry is written to the data cache and removed from the log.

32. The method of claim 30, further comprising:
- reading data associated with a load instruction from the non-retired store cache and the data cache; and
- selecting data from the non-retired store cache over the data cache.

33. The method of claim 32, further comprising:
- reading data associated with the load instruction from a store queue; and
- selecting data from the store queue over the non-retired store cache and the data cache.

* * * * *

UNITED STATES PATENT AND TRADEMARK OFFICE
CERTIFICATE OF CORRECTION

| | | |
|---|---|---|
| PATENT NO. | : 7,383,409 B2 | Page 1 of 1 |
| APPLICATION NO. | : 10/756638 | |
| DATED | : June 3, 2008 | |
| INVENTOR(S) | : Simon C. Steely, Jr. et al. | |

It is certified that error appears in the above-identified patent and that said Letters Patent is hereby corrected as shown below:

In column 1, line 20, delete "10/746,640" and insert -- 10/756,640 --, therefor.

In column 20, line 57, in Claim 1, after "initiating" delete "a".

In column 21, line 7, in Claim 4, delete "caehe" and insert -- cache --, therefor.

In column 21, line 35, in Claim 8, delete "MAE" and insert -- MAF --, therefor.

In column 23, line 10, in Claim 22, after "employing" insert -- a --.

In column 23, line 21, in Claim 22, after "if" delete "a".

In column 23, line 36, in Claim 25, delete "claim 24" and insert -- claim 22 --, therefor.

In column 24, line 18, in Claim 28, delete "(MAD)" and insert -- (MAF) --, therefor.

Signed and Sealed this

Twenty-sixth Day of August, 2008

JON W. DUDAS
*Director of the United States Patent and Trademark Office*